Nov. 3, 1959          G. L. NEELY          2,911,066
SPARK ARRESTER FOR MULTICYLINDER ENGINES
Filed Sept. 3, 1957          3 Sheets-Sheet 1
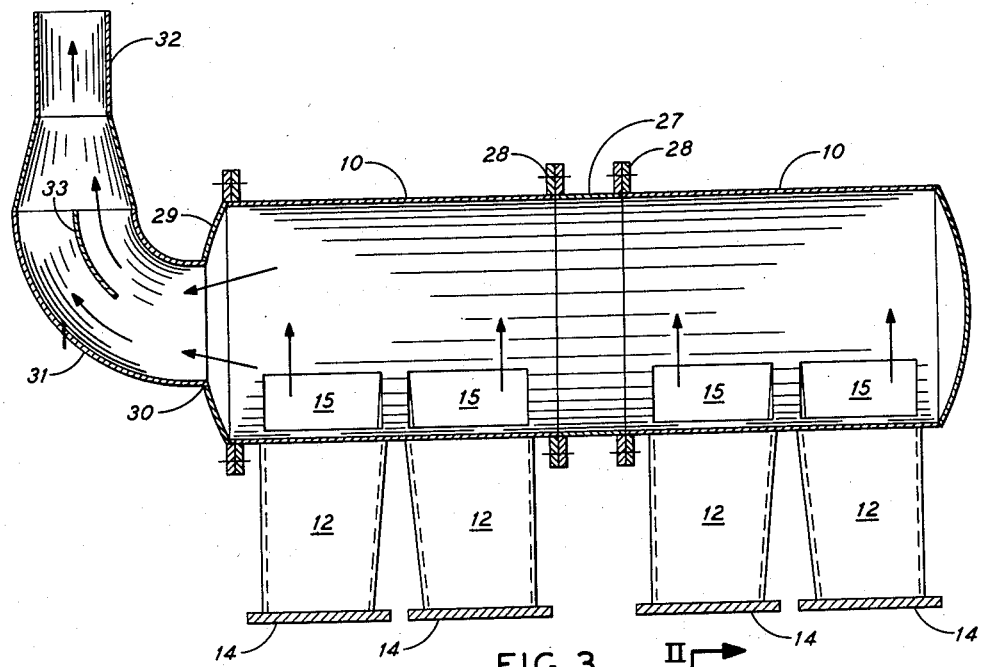
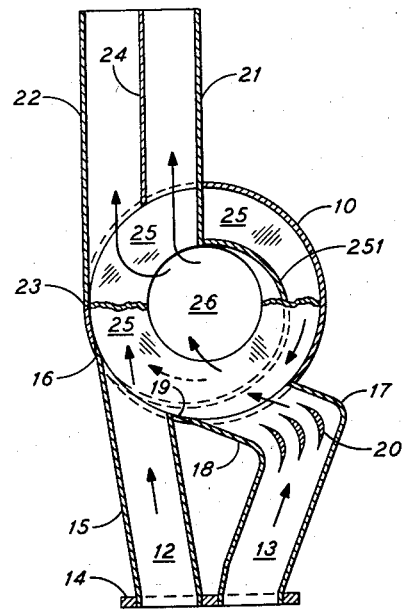
FIG. 2
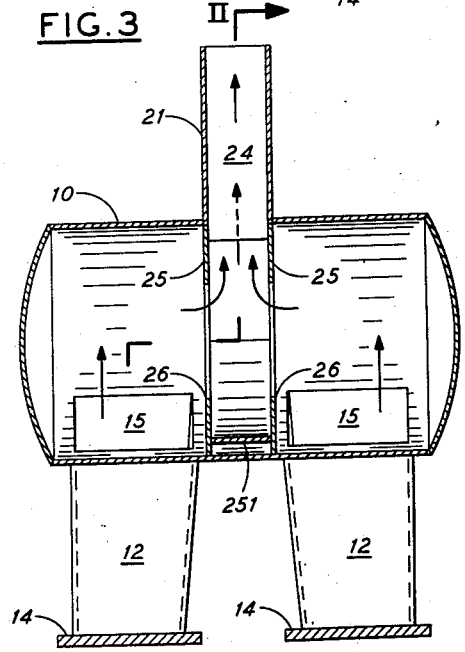
FIG. 1
INVENTOR
GEORGE L. NEELY
BY
ATTORNEYS Nov. 3, 1959  G. L. NEELY  2,911,066
SPARK ARRESTER FOR MULTICYLINDER ENGINES
Filed Sept. 3, 1957  3 Sheets-Sheet 2

INVENTOR
GEORGE L. NEELY
BY
ATTORNEYS

Nov. 3, 1959 G. L. NEELY 2,911,066
SPARK ARRESTER FOR MULTICYLINDER ENGINES
Filed Sept. 3, 1957 3 Sheets-Sheet 3
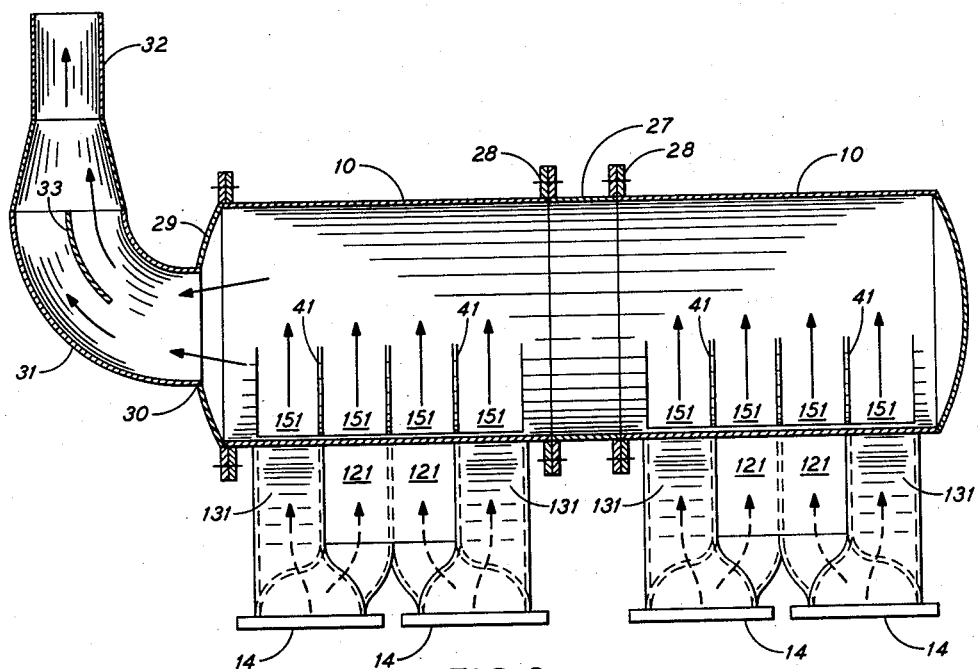
FIG.6
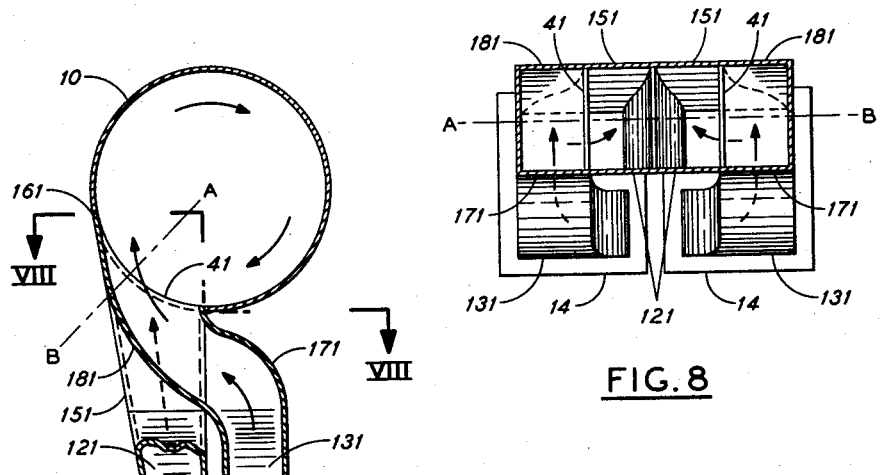
FIG.7
FIG.8
INVENTOR
GEORGE L. NEELY
BY
ATTORNEYS

United States Patent Office 2,911,066
Patented Nov. 3, 1959

2,911,066

SPARK ARRESTER FOR MULTICYLINDER ENGINES

George L. Neely, Berkeley, Calif., assignor, by mesne assignments, to California Research Corporation, San Francisco, Calif., a corporation of Delaware Application September 3, 1957, Serial No. 681,852

11 Claims. (Cl. 183—80)

This invention relates to multicylinder internal combustion engines of the diesel type and particularly refers to an exhaust manifold and spark arrester for a diesel engine utilizing residual petroleum fuels or blends of residual fuels with distillates which tend to produce carbonaceous deposits that, under certain conditions of engine operation, are ejected from the engine exhaust in a burning or incandescent condition and of substantial size.

Heretofore, in large multicylinder diesel engines of the type used in railway service, the contiguous exhaust ports are connected by stacks to a horizontal cylindrical chamber or header, from the top of which one or more outlets extend upwardly through the roof of the locomotive structure. The most common type utilizes transversely diverging stacks, the outer faces of which are tangential to opposite sides of the cylindrical header, so that the exhaust gases enter the chamber from opposite sides with respect to the longitudinal axis. This produces what could be termed "random turbulence" of the combustion products in the chamber, as the several stacks discharge successively and repetitively their pulses of exhaust gas and solid particles.

In addition, it has often been the practice to mount the chamber outlet substantially directly above one or more of these stacks, so that any solid, incandescent, carbonaceous particles that may be carried by the rapidly moving and randomly turbulent exhaust gases may pass substantially directly to the outlet without remaining in the header for any appreciable length of time or without contacting the inner face of the header at any point. These incandescent particles are sometimes quite large, and when they ultimately reach the ground are so hot that they often cause serious fires in dry grass, brush, trees, or other inflammable material that may be adjacent to the railway track.

Various expedients, such as metal screens and concentric deflecting baffles, have been placed in the chamber or header and in the outlet therefrom to prevent this occurrence and reduce the fire hazard, but, as will be shown later, these inevitably impede the flow of combustion products and offer such a pressure drop as seriously to reduce the available power output of the engine. Also, they are expensive to install and to maintain.

It is an object of this invention to provide structure for reducing spark size and frequency, as well as an improved unitary arrangement of upwardly extending exhaust stacks and a horizontal chamber that will direct all the combustion products, both gaseous and solid, to rotate circumferentially in only one direction within the enlarged zone formed by the chamber and about its longer axis, and, additionally, to leave the chamber only from a central zone near its longitudinal axis. Furthermore, this method is accomplished by a novel relationship of the stacks and chamber without concentric interposing baffles, helixes, screens, or the like that would increase the pressure drop imposed on the exhaust gases and thus reduce the engine power output. In addition, this improvement provides a chamber space residence time that permits the larger incandescent solid particles to be at least partially consumed before they leave the chamber, which, when added to the attrition they undergo by repeated impingement against the inner face of the chamber, so reduces their size that they are cooled and substantially innocuous before they reach the ground beside the track.

Another object is to provide a spark arrester and exhaust manifold unit that may be made in convenient sections and used to replace the present stack and chamber arrangements on engines now in service.

Another object is to provide a spark arresting and exhaust manifold unit that requires no clean-out or particle-removal provisions, as all the solids are so reduced in size as to be ultimately carried out by the rapidly moving exhaust gases.

The apparatus of this invention for reducing sparking from diesel engines, may be characterized broadly as including apparatus for introducing the products of combustion from the engine, including both exhaust gas and unburned carbonaceous residues, substantially tangentially into an elongated enlarged confined zone at a plurality of points spaced longitudinally along the zone so that they rotate therein in only one direction, segregating the larger unburned residue particles in the outer portion of the zone wherein they are reduced in size by combustion and attrition, and discharging only gas and smaller residue particles from the central portion of the zone.

The apparatus exemplified herein for carrying out the invention may be characterized broadly as comprising pairs of generally upwardly directed exhaust stacks leading from contiguous pairs of engine exhaust ports into a superposed, horizontal, radially unobstructed, cylindrical chamber, one corresponding side of each of the stacks being independently connected to be tangential to one side of the cylindrical chamber so that entering combustion products will rotate in the same direction about the longitudinal axis of the chamber, with means forming a passage to the chamber outlet that is substantially smaller than the chamber diameter so that the combustion products leave from a central zone near the longitudinal axis of the chamber.

These and other objects and advantages will be further apparent from the following description of several alternative embodiments of apparatus for practicing the invention, taken in connection with the attached drawings, which form part of this specification.

In the drawings:

Figure 1 is a vertical longitudinal sectional view of a simple form of this invention, illustrating contiguous stacks at each end of a single radially unobstructed chamber having a central outlet, with a smaller diameter passage leading thereto.

Figure 2 is a transverse vertical sectional view on line II—II of Figure 1, illustrating a tangential arrangement of the generally upwardly extending exhaust stacks, one corresponding side of each stack being tangential to the chamber.

Figure 3 is a longitudinal vertical sectional view of a multiple unit elongated enlarged chamber having an outlet at one end, and with tangential inlets as in Figure 2.

Figure 6 is a longitudinal vertical sectional view of an alternative arrangement of contiguous pairs of exhaust stacks to that of Figure 3, but with all the stacks curved so that their connections to the chamber are longitudinally aligned on one side of the centerline of the chamber.

Figure 7 is a vertical transverse sectional view of the aligned arrangement of exhaust stacks of Figure 6.

Figure 8 is a horizontal transverse sectional view on line VIII—VIII of Figure 7 of the aligned stack arrangement of Figures 6 and 7.

Figure 5:
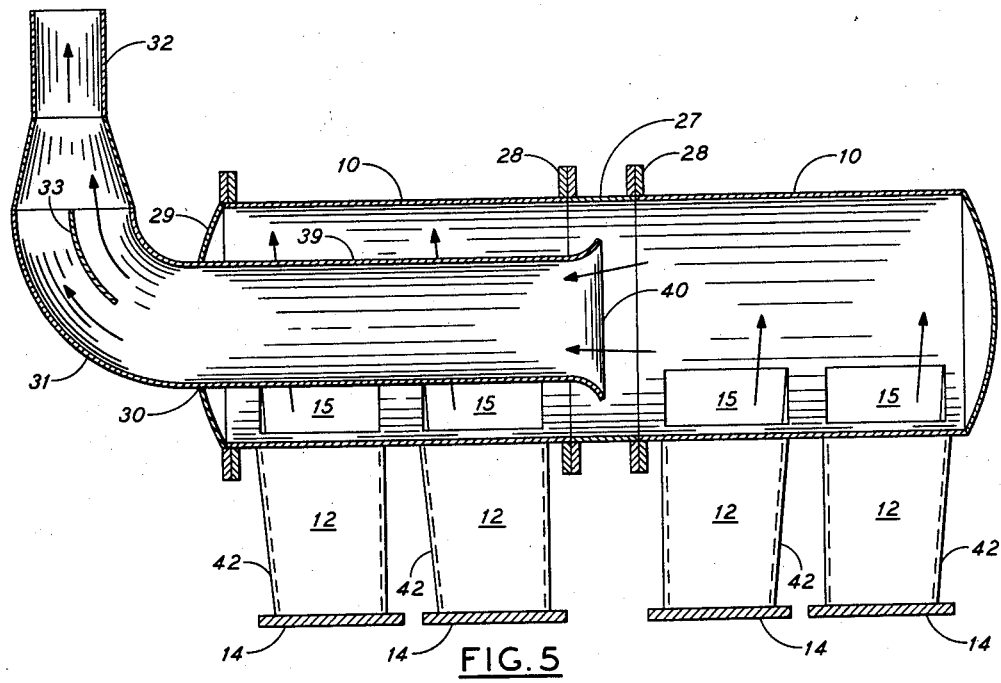
Figure 5 is a longitudinal vertical sectional view of an arrangement similar to Figure 3, but with a central outlet tube extending part way throughout the chamber from the end outlet, and with longitudinally diverging stacks, for a purpose which will be explained below.

Referring to the drawings, and particularly to Figures 1 and 2, reference number 10 designates generally a horizontal cylindrical chamber desirably formed of steel or other heat- and corrosion-resistant material supported on two pairs of generally upwardly extending exhaust stacks, also of steel or suitable alloy designated respectively 12 (left-hand) and 13 (right-hand), as they appear in Figure 2. The inlet end of each stack is provided with a flange 14 for connecting the inlet to its respective exhaust port on the top of the multicylinder diesel engine (not shown) for which this device is designed. The exhaust ports on the top of the engine, in the case of one having eight cylinders consisting of two parallel rows of four, may be designated as being both longitudinally and transversely aligned with respect to the engine axis. The four inlet stacks of Figures 1 and 2 may be described as consisting of two pairs of transversely aligned stacks 12 and 13 which are longitudinally aligned with a second pair.

Each left-hand stack 12 (Figure 2) extends generally upwardly so that the means forming its left-hand side 15 is tangential to the cylindrical wall of chamber 10 at point 16. Thus, exhaust gas entering chamber 10 through this stack will rotate in a clockwise direction within chamber 10 (Figure 2). The right-hand stack 13 is desirably provided with an elbow or recurved portion 17, so that the means forming its left-hand side 18 will be tangential to chamber 10 at point 19. In order to prevent undue pressure drop in elbow 17, it is desirable to place turning louvers 20 which direct the gas flow smoothly around the elbow so that it will enter chamber 10 and rotate in a clockwise direction therein.

For the four-stack arrangement of Figure 1, it may be desirable to have a central vertical exhaust gas outlet designated 21, one side 22 of which may also be tangential to chamber 10 at point 23. Desirably, but not necessarily, a straightening vane 24 may be provided in outlet stack 21 to prevent continued turbulence and thereby reduce the pressure loss in that stack.

As the combustion products, comprising both exhaust gases and unburned carbonaceous residue, enter the enlarged chamber 10 and rotate therein, the largest unburned solid residue, being heaviest, will be thrown outwardly against the inner wall of that chamber. The lighter and smaller particles of unburned carbonaceous residue will become concentrated in a zone along the longitudinal axis of chamber 10. To selectively withdraw these lighter components from this zone, outlet stack 21 desirably communicates with a central space within chamber 10 defined between annular plates 25, each having a central passage or opening 26. The diameter of the central passage is desirably less than about one-half, and may be one-third or even one-fourth that of chamber 10. This arrangement insures that the heavier and larger pieces of unburned carbonaceous residue will continue to rotate in a clockwise direction within chamber 10 outside of the zone defined by plates 25, until combustion has been completed to reduce their size or until they have been broken up by successive impingement against the chamber wall.

To facilitate smooth egress from the space between plates 25, an exit volute 251 may be provided, as shown.

Referring now to Figure 3, there is illustrated a similar arrangement of a composite chamber 10 and aligned pairs of stacks, the latter set in the same relation to the chamber as those of Figure 2. In this case, the two unit chambers 10 are connected by a ring 27 secured as by means of flanges 28 to each cylinder element. At the left end of this elongated chamber, to which all eight stacks are connected, is a flanged head 29 having a central outlet 30 corresponding to passage 26 of the annular plate arrangement 25 of Figure 1. A long radius elbow 31 leads from opening 30 to a generally vertical exhaust stack 32. Desirably, a turning louver 33 may be used in elbow 31 to reduce the turbulence that might otherwise occur therein. It will be apparent that this arrangement will function in a manner similar to that described for Figures 1 and 2, to selectively remove from elongated chamber 10 the exhaust gases and the lighter and smaller unburned carbonaceous residue so that the larger portions of this residue will remain within the outer portion of the chamber to be consumed and reduced in size.

Figure 4:
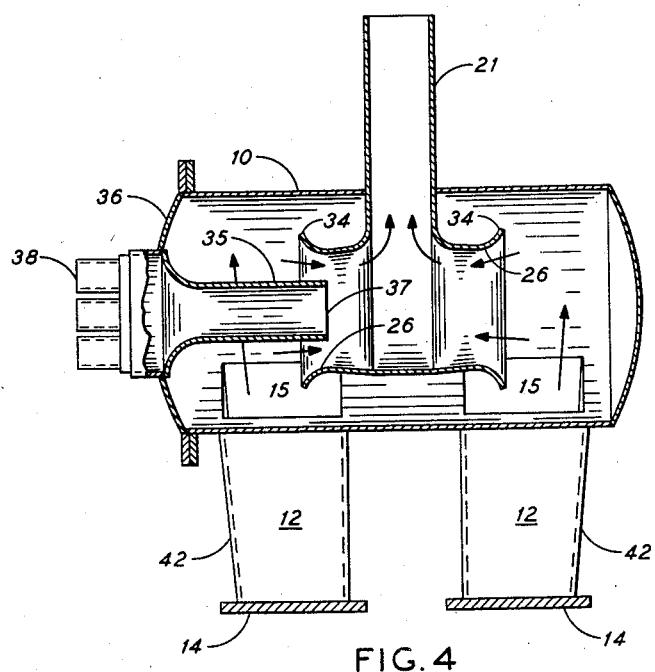
Figure 4 is a transverse sectional view of an alternative arrangement similar to that of Figure 1, but with venturi-shaped or bell-mouth axial inlets to the central exhaust outlet of the chamber, and with the addition of an axial tube for providing a source of reduced pressure for use in the air cleaning system of a diesel locomotive engine.

Referring now to Figure 4, it will be noted that this is a refinement of the arrangement of Figures 1 and 2 with the corresponding arrangement of chamber 10 and stacks 12 and 13, corresponding sides of which are tangential to one side of that chamber. In this example, entrance losses from the central zone of chamber 10 into outlet stack 21 are reduced by means of bell-mouth entrances 34, which are concentric with chamber 10 and communicate with 21, as shown to form a T. To simplify the construction of outlet stack 21, in this example, it may be only of the transverse width of entrances 34, and may be on the vertical axis of chamber 10, instead of tangential thereto, as in Figure 2.

One of the requirements of certain types of diesel engine locomotives is a source of reduced pressure to remove debris from an air cleaner. To obtain such a reduced pressure source, an axial tube 35 is arranged to project inwardly through a removable head 36 to terminate at 37 within one of the bell-mouth entrances 34. A plurality of connections 38 communicates with tube 35 and extends to the air-cleaning means just described (not shown).

Figure 5 represents an arrangement similar to Figure 3, but with an axial extension 39 from opening 30, which terminates in a bell-mouth inlet 40, substantially at the center of elongated chamber 10. In addition, it may be desirable to taper one side 42 of exhaust stacks 12, so that they diverge outwardly with respect to the center of chamber 10 between the heads thereof. This is intended to direct the products of combustion toward the ends of the chamber, so that they will remain therein for a somewhat longer period.

So far, the arrangements described for practicing the invention have utilized transversely aligned pairs of inlet stacks 12 and 13, corresponding sides of which are tangential to chamber 10 at points 16 and 19, respectively. The arrangement about to be described (Figures 6, 7, and 8) differs from that just mentioned by aligning the connections to chamber 10 along a common centerline AB, which, in this example, extends downwardly substantially 45 degrees from the longitudinal axis of the chamber (Figure 7).

Referring to Figure 7, the right-hand exhaust stack 131 extends upwardly and is smoothly curved transversely as at 171, so that its left-hand side 181 is tangential to chamber 10 at point 161. The left-hand stack 151 of this pair is curved longitudinally toward the right (Figure 8) beneath the upper end of stack 131, so that it enters chamber 10 directly beside and to the right of the first-named stack. This may conveniently be done by making a common wall 41, which serves both of these stacks. The arrows of Figure 8 illustrate how this arrangement is effected. For the next pair of stacks at the right-hand end of Figure 8, the arrangement just described is opposite hand, so that the common wall 41 is similarly between the right-hand and left-hand pair of stacks as they enter chamber 10. If desired, turning louvers similar to 20 (Figure 2) may be used in these stacks to reduce turbulence and pressure drop. They have been omitted from Figures 7 and 8 for purposes of simplification of the drawing, but their position and function will be readily understood by one skilled in this art. The arrangement thus described will effectively carry out the principal purpose of the invention, namely, to introduce the products of combustion tangentially into chamber 10 so that they rotate in a single direction therein instead of entering at various angles and directions that would produce random turbulence, as has heretofore been the practice.

The foregoing descriptions of the structure and mode of operation of apparatus suitable for practicing the invention illustrate clearly the method involved, viz., the steps of introducing the hot gaseous and solid products of combustion from each of the exhaust ports of a diesel engine independently and substantially tangentially into an elongated enlarged confined zone at a plurality of points spaced longitudinally along the zone in such a manner that they rotate therein in only one direction, so that the larger unburned particles or "sparks" are segregated in the outer portion of the zone, wherein they are reduced in size by combustion and attrition, and discharging only gas and smaller particles from the central portion of the zone.

It will be noted that the apparatus for practicing the invention is characterized by the provision of contiguous pairs of generally upwardly directed exhaust or inlet stacks leading to a superposed, horizontal, radially unobstructed cylindrical chamber, one corresponding side of each of the stacks being independently connected to be tangential to one side of the chamber, with means forming at least one passage out of the chamber to the atmosphere, said means being substantially smaller than the chamber diameter, generally less than about one-half, so that the combustion products leave only from a central zone near the longitudinal axis of the chamber.

In operation, spark arresters embodying these inventions demonstrated substantial advantages over the prior systems, as will be apparent from the following table summarizing extensive full power tests made on a 16-cylinder, 2-cycle diesel engine of 1500 H.P. in a railway locomotive hauling heavy freight trains over steep grades and using only residual fuel. The only operating and structural changes made between successive tests were in the spark arrester assembly.

Table

| Test No. | Spark Arrester Type | Avg. Back Pressure (Inches of Water) | Sparks Emitted |
| --- | --- | --- | --- |
| 1 | Factory installed unit | 37 | Numerous—unacceptable. |
| 2 | Factory installed unit plus outlet screen. | 50 | Do. |
| 3 | Figure 1 (without volute 251) | 37 | Reduced sparks about 85%. |
| 4 | Figure 3 | 37 | Reduced sparks about 95–100%. |
| 5 | Combination of Figures 3 and 4 (without suction tube 35). | 27 | Do. |

The frequency, size, and trajectories, or distances travelled by the sparks after leaving the outlet stack were observed at night under identical operating conditions. In Examples 1 and 2, the sparks ejected were large, numerous, and glowing hot, and travelled substantial distances. In Examples 3, 4, and 5 the sparks were small and faintly glowing, travelled only short distances, and were completely extinguished long before they reached the ground. This was particularly true of the arrangement of Examples 4 and 5.

Although exemplary arrangements of this invention have been described and illustrated, it is obvious that further modifications and changes could be made without departing from the essential features. Accordingly, all such changes that come within the scope of the appended claims are intended to be embraced thereby.

I claim:

1. A spark arrester and exhaust manifold for a multicylinder diesel engine having longitudinally aligned cylinders and contiguous pairs of top exhaust ports, comprising at least one transversely aligned pair of inlet stacks adapted to be connected to a pair of corresponding exhaust ports, a horizontal, cylindrical, radially and longitudinally unobstructed comminuting chamber connected to said stacks, one corresponding side of each of said stacks being independently and tangentially connected to one side of said chamber so their entering gaseous and solid combustion products will rotate in the same direction therein, a vertical outlet stack for said chamber, and means forming a passage connecting said chamber and said stack, the inlet to said passage being coaxial with said chamber, so constructed and arranged that solid combustion products will be segregated in a zone adjacent to the inner face of said chamber to be retained therein through successive revolutions until they are reduced in size by combustion and attrition to be carried out through said axial outlet by said gaseous products.

2. A spark arrester according to claim 1, in which said outlet stack is intermediate the ends of said chamber.

3. A spark arrester according to claim 1, in which said outlet stack is at one end of said chamber.

4. A spark arrester according to claim 1, in which all of said inlet stacks are aligned along a common axis parallel to the longitudinal axis of said chamber.

5. A spark arrester and exhaust manifold of the type dscribed, comprising a plurality of exhaust stacks, a horizontal, radially and longitudinally unobstructed cylindrical header connected to said stacks, and an imperforate coaxial outlet for said header communicating therewith in a plane transverse to its longitudinal axis, one corresponding side of each of said stacks being independently connected to be substantially tangential to one side of said header to impart rotation of solids and gaseous combustion products in only one direction therein to segregate and retain said solids adjacent the inner face of said header through successive revolutions, until said solids are reduced in size by combustion and attrition to be carried out of said coaxial outlet with said gaseous combustion products.

6. A spark arrester for a multicylinder diesel engine comprising a radially and longitudinally unobstructed horizontal cylindrical header, a plurality of longitudinally spaced pairs of initially transversely divergent exhaust gas inlet stacks, the first stack of each pair being substantially straight and connected to said header with its outer face tangential thereto, the second stack of said pair being connected to said header with its inner face terminating adjacent to the inner face of said first stack, said second stack being recurved intermediate its length so that said inner face is also tangential to said chamber whereby all of said stacks discharge combustion products in only one direction into said header, and an outlet for all comminuted solids and gaseous combustion products from said chamber communicating only with a central zone near its longitudinal axis and in a plane transverse to said axis.

7. A spark arrester according to claim 6 with the addition of turning louvres in the recurved portion of said second-named stack.

8. A spark arrester for a multicylinder diesel engine comprising a radially and longitudinally unobstructed horizontal cylindrical comminuting header, a plurality of longitudinally spaced pairs of initially transversely divergent exhaust gas inlet stacks for conveying gaseous and solid combustion products to said chamber, the first stack of each pair being substantially straight and connected to said header with its outer face tangential thereto, the second stack of said pair being connected to said header with its inner face terminating adjacent to the inner face of said first stack, said second stack comprising an elbow so that said inner face is also tangential to said chamber whereby all of said stacks discharge combustion products in only one direction into said header, and an outlet for all solids and gaseous combustion products from said chamber communicating only with a central zone near its longitudinal axis and in a plane transverse to said axis.

9. A spark arrester for a multicylinder diesel engine comprising a radially and longitudinally unobstructed cylindrical comminuting header having an outlet from its longitudinal axis for all solids and gases leaving said chamber, a plurality of longitudinally spaced pairs of exhaust gas inlet stacks, the first stack of each pair being connected to said header with its outer face tangential thereto, the second stack of said pair curving longitudinally and transversely intermediate its ends to be connected tangentially to said header between longitudinally spaced sets of first stacks so that all of said stacks intersect said header along a common axis AB parallel to the longitudinal axis of said header at one side thereof.

10. A spark arrester and exhaust manifold, comprising a plurality of rows of transversely aligned exhaust stacks, a radially and longitudinally unobstructed cylindrical chamber connected to said stacks, one corresponding side of each of said stacks being independently connected to be substantially tangential to one side of said chamber to impart rotation of gaseous combustion products and solids in only one direction in said shell, whereby solids in said combustion products will impinge directly against the inner face of said chamber and be retained therein through successive revolutions to be comminuted thereby, an outlet stack for said chamber spaced from one end thereof, and opposed means forming axial passages connecting said chamber and said outlet stack to convey said comminuted solids and gaseous combustion products thereto, inlets to said passage being coaxial with said chamber and opening in longitudinally spaced planes which are transverse to the longitudinal axis of said chamber.

11. A spark arrester according to claim 1 in which said outlet stack is vertical and has one side tangential to one side of said chamber, and includes means forming a volute connecting said stack and said opposed axial passages.

References Cited in the file of this patent

UNITED STATES PATENTS

| 2,103,809 | Bieth | Dec. 28, 1937 |
| 2,170,704 | Bourne | Aug. 22, 1939 |
| 2,706,012 | Chipley | Apr. 12, 1955 |
| 2,809,716 | Gill | Oct. 15, 1957 |

FOREIGN PATENTS

| 22,245 of 1908 | Great Britain | Oct. 20, 1908 |
| 200,380 | Great Britain | July 12, 1923 |